United States Patent
Angelopoulos et al.

(10) Patent No.: US 6,967,236 B1
(45) Date of Patent: Nov. 22, 2005

(54) METHODS OF PROCESSING AND SYNTHESIZING ELECTRICALLY CONDUCTIVE POLYMERS AND PRECURSORS THEREOF TO FORM ELECTRICALLY CONDUCTIVE POLYMERS HAVING HIGH ELECTRICAL CONDUCTIVITY

(75) Inventors: Marie Angelopoulos, Cortlandt Manor, NY (US); Yun-Hsin Liao, Tempe, AZ (US)

(73) Assignee: International Business Machines Corporation, Armonk, NY (US)

( * ) Notice: Subject to any disclaimer, the term of this patent is extended or adjusted under 35 U.S.C. 154(b) by 935 days.

(21) Appl. No.: 09/036,458

(22) Filed: Mar. 6, 1998

(51) Int. Cl.$^7$ .............................. C08J 3/00; C08F 6/00; H01B 1/00
(52) U.S. Cl. ...................... 528/491; 528/422; 528/423; 252/500
(58) Field of Search ................................ 528/422, 423, 528/491; 252/500

(56) References Cited

U.S. PATENT DOCUMENTS

| | | | | |
|---|---|---|---|---|
| 4,629,798 A | * | 12/1986 | Traynor | 548/562 |
| 4,772,421 A | * | 9/1988 | Ikenaga et al. | 252/500 |
| 4,902,573 A | * | 2/1990 | Jonas et al. | 428/411.1 |
| 5,863,658 A | * | 1/1999 | Tan | 428/423.1 |

FOREIGN PATENT DOCUMENTS

EP 0315514 * 5/1989

* cited by examiner

*Primary Examiner*—Tae H. Yoon
(74) *Attorney, Agent, or Firm*—Thomas A. Beck; Daniel P. Morris

(57) ABSTRACT

The present invention is directed to methods of solvating electrically conducting polymers and electrically conducting polymers by processing these materials in selected solvents comprising at least one of the solvents being a fluorinated solvent. High solubility and conductivity in the hundreds of S/cm are achieved by these methods. Excellent coatings are attained. These materials have application in EMI shielding, electrodes for displays, contacts for devices, ESD protection, corrosion protection and resists.

15 Claims, 5 Drawing Sheets

METHODS OF PROCESSING AND SYNTHESIZING ELECTRICALLY CONDUCTIVE POLYMERS AND PRECURSORS THEREOF TO FORM ELECTRICALLY CONDUCTIVE POLYMERS HAVING HIGH ELECTRICAL CONDUCTIVITY

FIELD OF THE INVENTION

The present invention is directed to methods of processing and sythesizing electrically conductive polymers and precursors thereof to form electrically conductive polymers having high electrical conductivity.

BACKROUND

Electrically conductive organic polymers have been of scientific and technological interest since the late 1970's. These relatively new materials exhibit the electronic and magnetic properties characteristic of metals while retaining the mechanical properties associated with conventional organic polymers. Herein we describe electrically conducting polymers and precursors thereof, for example substituted and unsubstituted polyparaphenylene vinylenes, polyparaphenylenes, polyanilines, polythiophenes, polyazines, polyfuranes, polypyrroles, polyselenophenes, poly-p-phenylene sulfides, polythianapthenes, polyacetylenes, combinations thereof and blends thereof with other thermoplastic and thermoset polymers and copolymers of the monomers thereof. These polymers are conjugated systems which are made electrically conducting by doping. The non-doped or non-conducting form of the polymer is referred to herein as the precursor to the electrically conducting polymer. The doped or conducting form of the polymer is referred to herein as the conducting polymer.

Conducting polymers have potential for a large number applications in such areas as electrostatic charge/(ESC/ESD) protection, electromagnetic interference (EMI) shielding, resists, electroplating, corrosion protection of metals and ultimately metal replacements, i.e. wiring, plastic microcircuits, conducting pastes for various technologies (solder alternative) etc. Many of the above applications especially those requiring high current capacity have not yet been realized because the conductivity of processable conducting polymers is not yet adequate for such applications. In order for these materials to be used in place of metals in more applications, it is desirable to increase the conductivity of these materials. In addition, the processability of these polymers also requires improvement. Although some these polymers are soluble, the solubility is generally limited and the solutions tend to be not stable over time.

The polyaniline class of conducting polymers has been shown to be one of the most promising and most suited conducting polymers for a broad range of commercial applications. The polymer has excellent environmental stability and offers a simple, one-step synthesis. However, the conductivity of the material in its general form (unsubstituted polyaniline doped with hydrochloric acid) is generally on the low end of the metallic regime most typically, on the order of 1 to 10 S/cm (A. G. Macdiarmid and A. J. Epstein, Faraday Discuss. Chem. Soc. 88, 317, 1989). In addition, the processability of this class of polymers requires further improvement. Although polyaniline is a soluble polymer, it has been noted that the solutions tend to be unstable with time (E. J. OH et al, Synth. Met. 55–57, 977 (1993). Solutions of for example the polyaniline in the non-doped form tend to gel upon standing. Solutions greater than 5% solids concentration tend to gel within hours limiting the applicability of the polymer. Solubility of the doped, conducting form has generally been less than that observed with the non-doped form. It is desirable to devise methods of increasing the conductivity of the doped polyanilines and to enhance the processability of these systems to allow broader applicability.

The conductivity ($\sigma$) is dependent on the number of carriers (n) set by the doping level, the charge on the carriers (q) and on the mobility ($\mu$) (both interchain and intrachain mobility of the carriers.

processing the conducting polymer or conducting polymer precursor by using selected solvents which can effectively solvate the polymer chains to allow higher levels of conductivity to be achieved are described.

OBJECTS

It is an object of the present invention to process electrically conductive polymers and precursors thereof to reult in polymers having substantially enhanced electrical conductivity.

It is an object of the present invention to process electrically conducting polymers and precursors thereof to result in polymers having high solubility.

It is an object of the present invention to process electrically conductive polymers and precursors thereof in appropriate solvents which are capable of effectively solvating the chains to give rise to materials having high electrical conductivity and good solubility.

It is an object of the present invention to attain highly conducting electrically conducting polymers and precursors thereof by using appropriate solvents capable of effectively solvating the polymer chains during the synthesis of the polymer.

It is an object of the present invention to process conducting polymer precursors in these selected solvents so as to achieve more uniform doping.

It is an object of the present invention to process conducting polymer precursors and conducting polymers in these selected solvents so as to achieve high solubility and good solution stability.

It is an object of the present invention to process conducting polymer precursors and conducting polymers in these selected solvents so as to better process these polymers into films, fibers, or any structural form.

It is an object of the present invention to deaggregate aggregated molecules which are precursors to the electrically conducting polymers or so that the molecules can be more processed into films, fibers, or any structural form having tunable morphology and mechanical/physical properties.

It is an object of the present invention to deaggregate aggregated molecules which are electrically conducting polymers.

It is an object of the present invention to deaggregate aggregated molecules which are electrically conducting polymers so that the molecules can exhibit good processability and good solution stability.

It is an object of the present invention to deaggregate aggregated molecules which are electrically conducting polymers so that the molecules can be more effectively processed into films, fibers, or any structural form.

It is an object of the present invention to deaggregate aggregated molecules which are electrically conducting polymers so that the molecules can be more effectively processed into films, fibers, or any structural form having tunable morphology and mechanical/physical properties.

It is an object of the present invention to increase the electrical conductivity of electrically conductive polymers.

It is another object of the present invention to increase the electrical conductivity of electrically conductive polymers by extending the electrically conductive regions or islands of the electrically conductive polymer.

It is another object of the present invention to further increase the electrical conductivity of a deaggregated electrically conductive polymer by stretch orientation.

SUMMARY OF THE INVENTION

A broad aspect of the present invention is a method of processing electrically conducting polymers or precursors thereof or synthesizing electrically conducting polymers or precursors thereof in appropriate solvents which effectively solvate the polymer chains so as to result in polymers having high electrical conductivity, good solubility, and good solution stability.

A more specific aspect of the present invention is a method of processing electrically conducting polymers or precursors thereof providing better processability of these polymers into films, fibers or structural forms which exhibiti high electrical conductivity.

A more specific aspect of the present invention is a method of effectively solvating electrically conducting polymers or precursors thereof resulting in films, fibers, or structural forms having tuned morphology.

A more specific aspect of the present invention is a method of effectively solvating electrically conducting polymers or precursors thereof resulting in films, fibers or structural forms having larger electrically conducting regions or islands in the electrically conducting polymer.

A more specific aspect of the present invention is a method of effectively solvating electrically conducting polymers or precursors thereof resulting in films, fibers, or structural forms having deaggregated polymer chains.

A more specific aspect of the present invention is a method of effectively solvating electrically conducting polymers or precursors thereof resulting in films, fibers, or structural forms having high crystallinity.

A more specific aspect of the present invention is a method of fabricating electrically conducting polymers and precursors thereof that are deaggregated; deaggregated polymer exhibits increased solubility processability, higher conductivity upon doping, and more uniform doping than do the corresponding aggregated polymers.

A more specific aspect of the present invention is a method of providing well solvated electrically conducting polymers having application for electrodes for displays and devices, electromagnetic interference shielding, electrostatic charge/discharge protection, corrosion protection, resists, and circuits.

BRIEF DESCRIPTION OF THE DRAWINGS

Table 1 depicts Examples of Doped Polyanilines in Suitable Solvents Giving High Conductivity.

Table 2 depicts EMI Shielding results on the polyaniline acrylamidopropanesulfonic acid coatings processed from hexafluoroisopropanol/hexafluorophenylpropanol.

Further objects, features, and advantages of the present invention will become apparent from a consideration of the following detailed description of the invention when read in conjunction with the drawing FIGs., in which.

DETAILED DESCRIPTION

The present invention is directed to methods of processing electrically conducting polymers or precursors thereof resulting in high electrical conductivity, good solubility, and good solution stability. Examples of such polymers that can be used to practice the present invention are substituted and unsubstituted polyparaphenylenes, polyparaphenylevevinylenes, polyanilines, polyazines, polythiophenes, polythianapthenes, poly-p-phenylene sulfides, polyfuranes, polypyrroles, polyselenophenes, polyacetylenes formed from soluble precursors and combinations thereof and copolymers of monomers thereof. The general formula for these polymers can be found in U.S. Pat. No. 5,198,153 to Angelopoulos et al. the teaching of which is incorporated herein by reference. The present invention will described with reference to one type of polymer which is a substituted or unsubstituted polyaniline or copolymers of aniline with other monomers having the general formula shown in FIG. 1 wherein each R can be H or any organic or inorganic radical; each R can be same or different; wherein each $R^1$ can be H or any organic or inorganic radical, each $R^1$ can be the same or different $x \geq 1$; preferably $x \geq 2$ and y has a value from 0 to 1. Examples of organic radicals are alkyl or aryl radicals. Examples of innorganic radicals are Si and Ge. This list is exemplary only and not limiting.

Figure 1A:
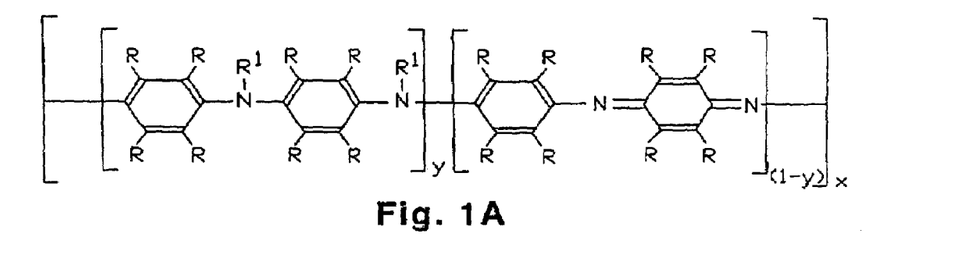
FIG. 1 is a general formula for a polyaniline; (a) is the precursor form of the polymer or the non-doped form of the polymer; (b) is the doped form of the polymer or the electrically conducting form of polyaniline; (c) is the actual structure for the doped electrically conducting polymer consisting of a polysemiquinone radical cation.
Figure 1B:
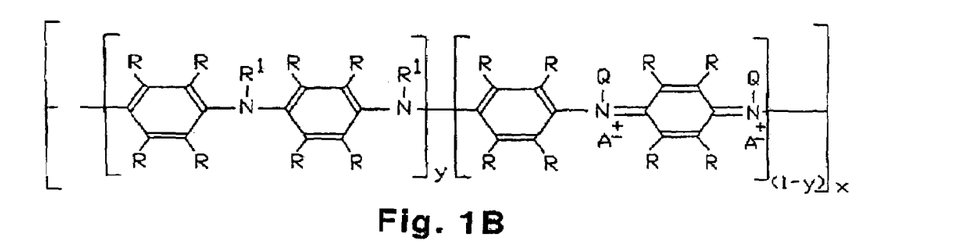
Figure 1C:
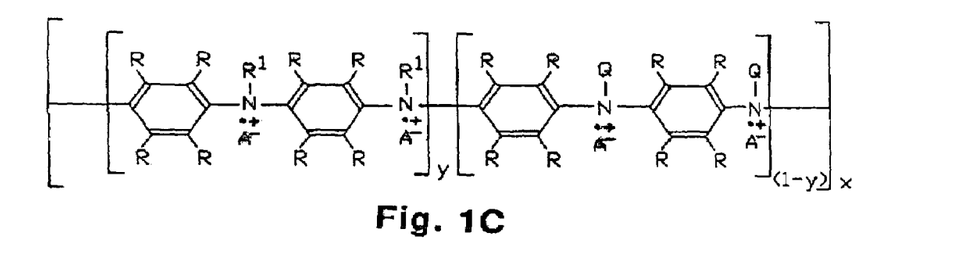

The precursor to the electrically conducting polymer form is shown in FIG. 1a. This is the non-doped form of the polymer or the base polymer. FIG. 1b shows polyaniline doped with a dopant. If the polyaniline base is exposed to cationic species QA, the nitrogen atoms of the imine part of the polymer become substituted with the Q+ cation to form an emeraldine salt as shown in FIG. 1b. Q+ can be selected from H+ and organic or inorganic cations, for example, an alkyl group or a metal. QA can be a protic acid where Q is hydrogen. When a protic acid HA is used to dope the polyaniline, the nitrogen atoms of the imine part of the polyaniline are protonated. The emeraldine base form is greatly stabilized by resonance effects. Charges distribute through the nitrogen atoms and aromatic rings making the imine and amine nitrogens indistinguishable. The actual structure of the doped form is a delocalized polysemiquinone radical cation as shown in FIG. 1c.

Polyaniline can exist in a number of oxidation states. The emeraldine form of the polymer refers to the material that consists of approximately equal number of benzenoid units and quinoid units (y=0.5 in FIG. 1). The emeraldine polymer can be reduced to the leucoemeraldine polymer where y=1 in FIG. 1. The leucoemeraldine base form of the polymer is not stable in ambient conditions. The emeraldine polymer can be oxidized to the pernigraniline form where y=0; however, the fully oxidized form of the polymer also tends not to be stable. In principle, other oxidation states intermediate between y=0 and y=1 are possible. The emeraldine base form of the polyaniline is the most stable form. Because of its environmental stability, it is the form of polyaniline that has been the most abundantly studied and is the form that is suited for technological applications. The most preferred embodiment of the present invention is the emeraldine base form of the polyaniline wherein y has a value of approximately 0.5.

The emeraldine base form of polyaniline is soluble in various organic solvents and in various aqueous acid solutions. Examples of organic solvents are dimethylsulfoxide (DMSO), dimethylformamide (DMF), N-methylpyrrolidinone (NMP), N,N'dimethyl propylene urea (DMPU), pyridine, m-cresol, phenol and so on. This list is exemplary only and not limiting. Examples of aqueous acid solutions are aqueous acetic acid and formic acid solutions. This list is exemplary only and not limiting.

Polyaniline is generally processed in NMP by first dissolving the base form of the polymer in this solvent. This solution can be processed by spinning, spray coating, or roll coating into a film form, it can be processed into a fiber or any other structural form. The polymer can be made conducting by adding a dopant to the base solution or by doping the base film, fiber, or other structural form. The level of conductivity that can be achieved for polyaniline processed from NMP is generally on the order of 10 −2 S/cm and below.

Figure 2:
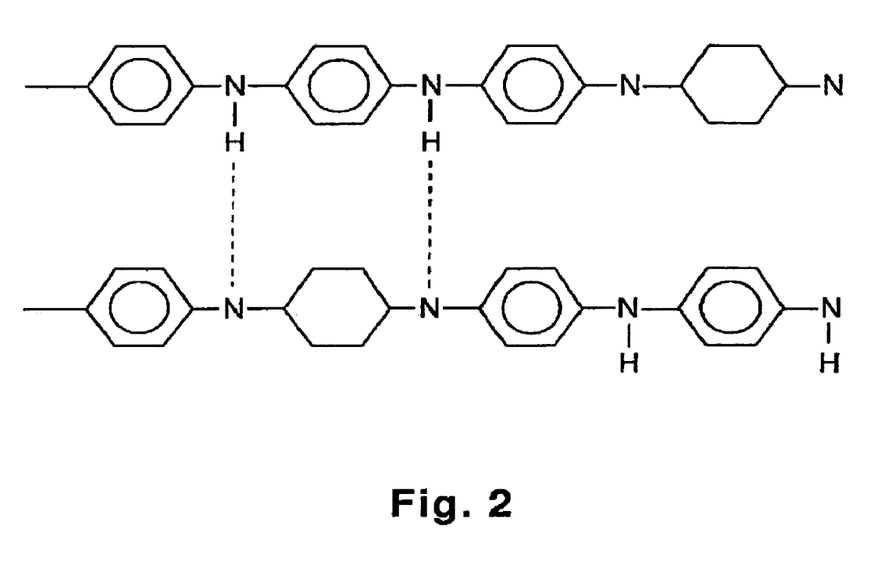
FIG. 2 depicts interchain hydrogen bonding in emeraldine base between an amine site of one chain and an imine site of a second chain.

Previously we disclosed (U.S. Ser. No. 08/370,127 filed on Jan. 9, 1995 and U.S. application Ser. No. 08/370,128 filed on Jan. 9, 1995, the teachings of which are incorporated herein by reference.) that polyaniline in the emeraldine base form aggregates as a result of interchain hydrogen bonding between the amine and imine sites as shown schematically in FIG. 2. When the base polymer is dissolved in NMP, NMP does not effectively solvate the polyaniline chains so as to disrupt the internal H-bonding that is present between chains. Thus, polyaniline in NMP is highly aggregated. These aggregates were evidenced by a bimodal molecular weight distribution in gel permeation chromatography. Emeraldine base in NMP for example exhibits a bimodal distribution consisting of a high molecular weight fraction and a second fraction of low molecular weight. This high molecular weight fraction is due to chain aggregation resulting in "pseudo" high molecular weights. The aggregation in polyaniline limits the doping uniformity, the level of conductivity that can be achieved upon doping, the degree of crystallinity, and the degree of chain expansion of the chains. In addition, it limits the solubility of the polymer and the stability of the solutions. Previously we disclosed that certain additives such as lithium chloride could be added to these solutions to disrupt the hydrogen bonding and in turn reduce or eliminate the high molecular weight fractions.

Herein, we disclose novel methods of more effectively solvating polyaniline resulting in higher levels of electrical conductivity, good solubility and good solution stability. This is done by using solvents or solvent mixtures which can effectively interact with polyaniline by H-bonding or by other chemical interactions to result in highly solvated chains in solution which have significantly less interchain interactions or aggregation. These solutions can be processed into the solid state form giving rise to a more deaggregated structure, a structure having more expanded chains, and a more crystalline structure. It is found that fluorinated polar solvents either alone or in combination with other fluorinated solvents or with other non fluorinated solvents are effective solvents for the polyaniline.

A non limiting examplary list of flourinated solvents useful to practice the present invention include:
(Fluorinated Alcohols or Phenols)
Hexafluoroisopropanol
Tetrafluoropropanol
Pentafluoropropanol
Hexafluorophenylpropanol
Perflurobutyl alcohol
Octafluoropentanol
Hexafluoro-2-propanol
Pentafluoro-1-Propanol
Tetrafluorophenol
Triflurophenol
Diflurophenol
Tetrafluoro-1-Propanol
4-(Trifluoromethyl)benzyl alcohol
2,2,2-Trifluoroethanol
2,4,5 Trifluorophenol
2,4 Difluorobenzyl alcohol
2,4 Difluorophenol
4-Fluorobenzyl alcohol Other examples of fluorinated alcohols or phenols include:
2,2,3,3,3-pentafluoro-1-propanol, 2-(perfluorobutyl)ethanol, 2-(perfluorohexyl)ethanol, 2-(perfluorooctyl)ethanol, 2-(perfluorodecyl)ethanol,
2-(perfluoro-3-methylbutyl)ethanol, 1H,1H,3H-tetrafluoro-1-propanol,
1H,1H, 5H-octafluoro-1-pentanol, 1H,1H, 7H-dodecafluoro-1-heptanol,
1H,1H,9H-hexadecafluoro-1-nonanol, 2H-hexafluoro-2-propanol or
1H,1H,3H-hexafluoro-2-butanol;
(Fluorine containing acids)
trifluoroacetic acid, perfluoropropanoic acid, perfluorobutanoic acid,
perfluoropentanoic acid, perfluorohexanoic acid, perfluoroheptanoic acid,
perfluorooctanoic acid, perfluorononanoic acid, perfluorodecanoic acid,
3H-tetrafluoropropanoic acid, 5H-octafluoropentanoic acid, 7H-dodecafluoropentanoic acid or 9H-hexadecafluorononanoic acid, an amide of such a fluorine-containing carboxylic acid, trifluoromethanesulfonic acid or heptadecafluorooctanesulfonic acid.
perfluorobenzene, hexafluorometaxylene and such polyfluoroaromatic compounds,
perfluorotributylamine, perfluorotripropylamine and such polyfluorotrialkylamin compounds, perfluorohexane, perfluorooctane, (perfluoro-n-octyl) ethane,
perfluoro-(2,3,5-trimethylhexane), and other such polyfluoroalkane compounds,
(perfluoro-n-octyl) ethylene and such polyfluoroolefin compounds, perfluorocyclohexane, perfluorodecalin and such polyfluorocycloalkane compounds perfluoro-(2-butyltetrahydrofuran) and such polyfluorocyclic ether compounds;
trichlorotrifluoroethane and such chlorofluorocarbons,
1,3-dichloro-1,1,2,2,3-pentafluoropropane,
1,1-dichloro-2,2,3,3,3-pentafluoropropane and such chlorofluorohydrocarbons,
fluorine-containing low molecular weight polyethers, and the like.
1,1,2-trichloro-1,2,2-trifluoroethane, perfluoro (2-butylhydrofuran) and perfluorohexane, perfluoro(2-butyl tetrahydrofuran) (Florinert FC-75, a product by Minnesota Mining and Mnufacturing Co.), 1,1,2-trichloro-1,2,2-trifluoroethane (F-113),
perfluoro(2-butyltetrahydrofuran), perfluorohexane, 1,1,2-trichloro-1,2,2-trifluoroethane,
perfluoro (2-butyltetrahydrofuran) and perfluorohexane. 1,1,2-trichloro-1,2,2-trifluoroethane Florinato FC-40, FC-75, etc. (trade name; manufactured by 3M (K.K.)).
hexafluorobenzene, benzorifluoride, bisrifluoromethylbenzene
pentafluorobenzene, 1,3-bis(trifluoromethyl)benzene or 1,4-bis(trifluoromethyl)benzene; a fluorine-containing alicyclic hydrocarbon
such as perfluorodecalin, perfluorocyclohexane or
perfluoro(1,3,5-trimethylcyclohexane); a fluorine-containing alkylamine such as perfluorotributylamine or perfluorotripropylamine; a fluorine-containing cyclic ether such as perfluoro(2-butyltetrahydrofuran), a fluorine-containing polyether such as a fluorine-containing low molecular weight polyether; a
fluorine-containing ketone such as bis(heptafluoroisopropyl)ketone; as well as a fluorine-containing aliphatic hydrocarbon such as perfluorohexane,
perfluoro carboxylic acid derivatives such as methyltrifluoro acetate,
ethyltrifluoro acetate and butylpentafluoro propionate;
hydrochlorofluorocarbons such as HCFC-123, HCFC-141b and HCFC-225.
"Aflood" (a fluorine-containing solvent by Asahi Glass Co., Ltd.).
fluorine-containing solvents such as
trichlorotrifluoroethane, monofluorotrichloromethane and the like.
other fluorine-substituted ketones, foluorine-substituted
esters, fluorine-substituted amides, fluorine-substituted ethers,
fluorine-substituted aromatic hydrocarbon and fluorine-substituted aliphatic hydrocarbon.
1,1,2-trichloro-1,2,2-trifluoroethane,
1,1,2,2-tetrachloro-1,1-difluoroethane, (trifluoromethyl)benzene and
1,3-bis(trifluoromethyl)benzene
1,1,2-trifluorotrichloroethane, 1,2-difluorotetrachloroethane,
hexafluorometaxylene, 1,1,2,3,4-hexafluorotetrachlorobutane and the like.
a fluorine-containing solvent (Diflon Solvent S-3, produced by Daikin Kogyo Co., Ltd.)
octafluorodichlorobutane, 1,1,2-trifluoro-1,2,2-trichloroethane,
1,2-difluoro-1,1,2,2-tetrafluoroethane
fluorine-containing solvent is selected from the group consisting of fluorohalogenides; perfluoro alkanes; perfluoro alkenes; cyclic fluoride compounds; perfluorohydrides; perfluorocarboxylic acids; perfluoroketones;
perfluoroaldehydes; perfluoroalcohols; perfluoroethers; amine fluorides;
perfluorothiols; perfluorosulfonic acids; and organic-phosphorus compound-arsenic compound-fluorine derivatives.
vinyl fluoride; vinylidene fluoride; trifluoroethylene; chlorotrifluoroethylene (CTFE);
1,2-difluoroethylene; tetrafluoroethylene (TFE); hexafluoropropylene (HFP); perfluoro(alkyl vinyl) ethers such as perfluoro(methyl vinyl) ether (PMVE), perfluoro(ethyl vinyl) ether, and perfluoro(propyl vinyl) ether (PPVE); perfluoro (1,3-dioxole);
perfluoro(2,2-dimethyl-1,3-dioxole) (PDD)
fluorinated solvent is selected from, the group consisting of perfluorotoluene, perfluorocyclohexane,
perfluorodimethylcyclohexane, perfluoro-methylcyclohexane, perfluoroxylene, perfluorobenzene,
perfluorodecalin, perfluorodecate, perfluorohexane, perfluoroctane,
perfluorodecane, trifluorotoluene, pentafluorotoluene and low molecular weight
liquid polymers having the structure of fluorinated polyethers
dichlorodifluoromethane, 1,1-dichlorotetrafluoroethane,
1,2-dichlorotetrafluoroethane, 1-chloro-1,1-fluoroethane,
1-chloroheptafluoropropane, 1,1,1,2,2-pentafluoropropane, perfluorobutane,
2,3-di-chlorooctafluorobutane, and 2,2,3,3-tetrafluorobutane. Preferred solvents include butane, pentane, 1,1-dichloro-1-fluoroethane, and
1,2-dichlorotetrafluoroethane; perfluoroisooctane, perfluorotributylamine,
perfluoroheptane,
perfluorinated 2-butyltetrahydrofuran
perfluorohexane, perfluorotributylamine, perfluorotriamylamine,
fluorinated alkenes such as pentafluorostyrene, octafluorostryene,
perfluoro-1,4-pentadiene, perfluoro-1,6-heptadiene, 3,5-bis(trifluoromethyl) styrenes, etc.; fluorinated acrylates and methacrylates such as 2,2,3,3,4,4,5,5,6,6,7,7,8,8,8-pentadecafluorooctyl acrylate,
2,2,3,3,4,4,5,5,6,6,7,7,8,8,8-pentadecafluorooctyl methacrylate,
2,2,3,3,4,4,5,5,6,6,7,7,8,8,9,9,10,10,10-nonadecafluorodecyl methacrylate,
1,2,2,3,3,4,4,5,5,6,6-undecafluorocyclohexylmethyl acrylate,
1,2,2,3,3,4,4,5,5,6,6-undecafluorocyclohexylmethyl acrylate,
1,2,2,3,3,4,4,5,5,6,6-decafluoro-4-trifluoromethylcyclohexylmethyl acrylate,
perfluorohexyl acrylate, perfluorobutyl acrylate, perfluorodecyl acrylate,
2,2,2-trifluoroethyl acrylate, 2,2,2-trifluoroethyl methacrylate,
1,1,1,3,3,3,-hexafluoro-2-propyl acrylate, C8F17SO2N(n-C4H9)CH2CH2O2CCH=CH2, etc; trifluorinated alkyl acrylonitriles, e.g., trifluoromethyl acrylonitrile;
perfluoroalkyl vinyl ethers such as perfluorobutyl vinyl ether, pentafluoroethyl vinyl ether, . . .

Any combination of the above solvents. It is found as is shown in the experimental section that when polyaniline is processed in certain combination of the above solvents that higher conductivity is attained than that from the corresponding individual solvents.

The above fluorinated solvents can be used with mixtures with non fluorinated solvents including nonfluorinated alcohols, phenols, esters, ethers, ketones, amides, amines, alkanes, cyclic alkanes, alkenes, aromatics, and so on such as anisole, benzyl alcohol, cyclohexanone, ethyl lactate, ethyl acetate, diethyl ketone, diethyl malonate, m-cresol, phenol, N-methylpyrrolidinone, N-dimethylformamide, propylene glycol dimethyl ether acetate, isopropanol, ethanol, water, dimethylpropylene urea, gamma butyrolactone, diethylether, benzene, toluene, chloroform, tetrahydrofuran, heptanone, pentanones, and so on.

EXAMPLES

The unsubstitued polyaniline in the emeraldine form is synthesized by the chemical oxidative polymerization of aniline in 1N HCl using ammonium peroxydisulfate as an oxidizer. Polyaniline can also be oxidatively polymerized electrochemically as taught by W. Huang, B. Humphrey, and A. G. MacDiarmid, J. Chem. Soc. Faraday Trans. 1,82, 2385, 1986. In the chemical synthesis, the conducting polyaniline hydrochloride (hydrochloride) salt precipitates from solution. The polymerization is allowed to proceed for several hours after which the powder is filtered, washed with excess 1N hydrochloric acid. The emeraldine hydrochloride is then converted to non-conducting or non-doped emeraldine base by reaction with ammonium hydroxide. The emeraldine base is then filtered, washed with ammonium hydroxide, then washed with methanol and dried. The polymer at this stage is in the undoped emeraldine base form as a powder.

Substituted (either on the aromatic ring or on the nitrogen) polyanilines in the emeraldine form are synthesized in the fashion as above but using the appropriate substituted aniline monomer in the polymerization reaction. Copolymers are made by the oxidative polymerization of one or more monomers. Acids can also be used in the polymerization reaction other acid. Aqueous acetic acid, sulfuric acid, organic sulfonic acids, such as aqueous toluenesulfonic acid, dodecylbenzenesulfonic acid, camphorsulfonic acid, and so on. The o-ethoxy substituted polyaniline was prepared by polymerization of o-ethoxy aniline in 1N hydrochloric acid described above. Copolymers having various amounts of o-ethoxy content were synthesized by polymerizing o-ethoxyaniline and aniline in aqueous 1N hydrochloric acid. The amount of o-ethoxy content in the final polymer was controlled by varying the feed ratio of this monomer in the initial polymerization reaction. Other substituted derivatives such as the substituted polyaniline as described in U.S. application Ser. No. 08/595,853 filed on Feb. 2, 1996 entitled "Cross-Linked Electrically Conductive Polymers and Precursors Thereof" and U.S. application Ser. No. 8/594,680 filed on Feb. 2, 1996 entitled "Methods of Fabricating Cross-Linked Electrically Conductive Polymers and Precursors Thereof" the teachings of which are incorporated herein by reference.

The substituted and unsubstituted emeraldine base powder is generally processed by dissolving the powder in an organic solvent and mechanically stirring the admixture to form a solution. The solution can be used to spin-coat films of the emeraldine base polymer on silicon wafers, quartz wafers, salt plates, and so on. These films were on the order of 500 A to 1.0 &mu.m. Thicker films (on the order of 50 to 200 &mu.m) were made by solution casting techniques in the solution was poured into an aluminum pan or glass dish and placed in a vacuum oven at 60 C for 24 hours. The solution can also be used to process the material into a structural part or into a fiber. The substituted emeraldine base such as the o-ethoxy substituted emeraldine base was more soluble than the unsubstituted emeraldine base. This polymer can be dissolved in cyclohexanone, tetrahydrofuran, ethyllactate and so on. A solution was made in cyclohexanone (5% solids) and this solution was used to process films (thin and thick).

The base form of the material is made conducting by adding a dopant to the base solution and allowing the reaction to stir over night. The dopant can be added to the solvent in conjunction with the base polymer and allowed to react overnight. In addition, the dopant can be added to the solvent first, dissolved, then adding the base form of the polymer and allowing the reaction to proceed overnight. In addition, structural parts, films, or fibers can also be processed from these conducting polymer solutions.

SPECIFIC EXAMPLES

Figure 3:
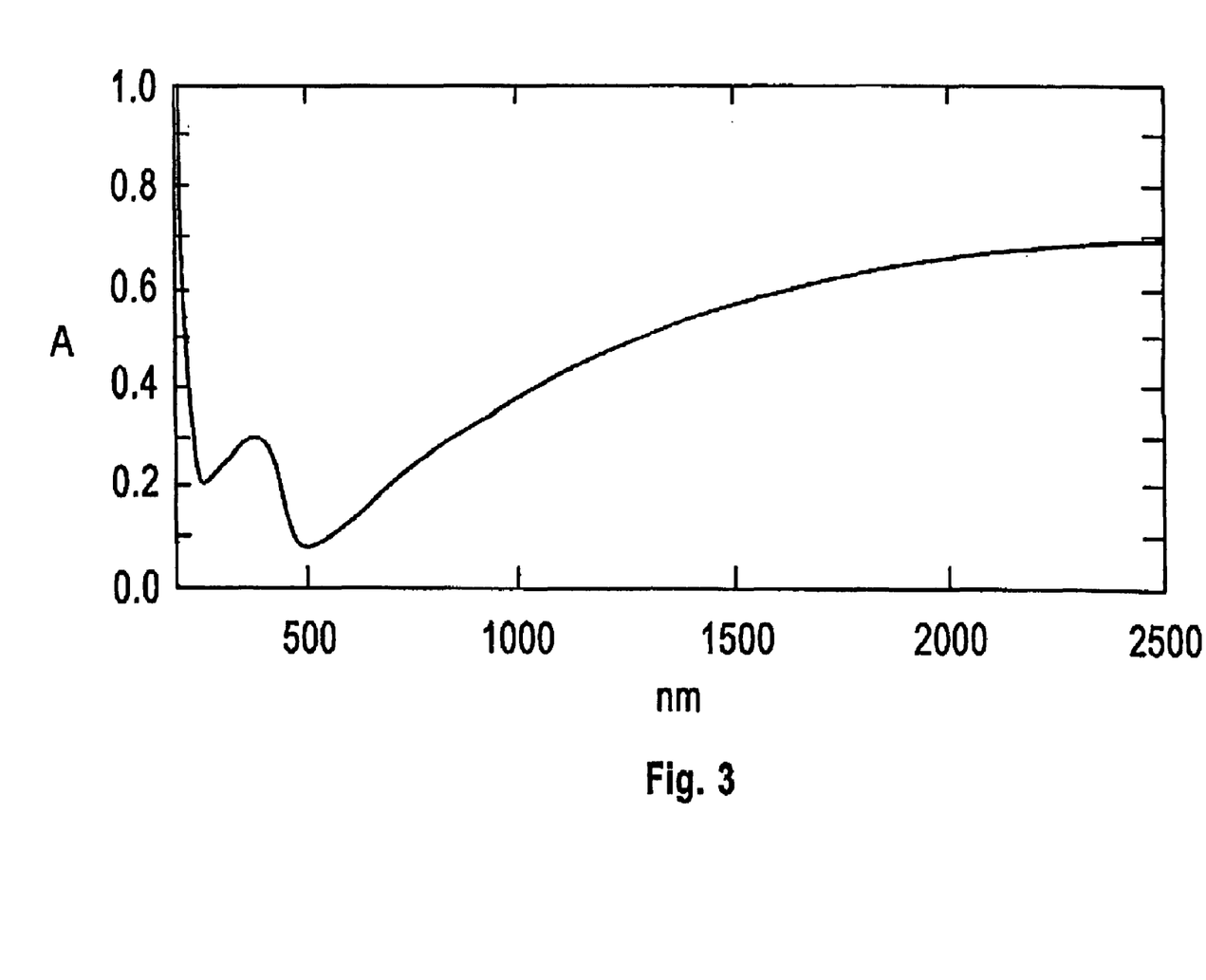
FIG. 3 deptics a utlraviolet/visible/near IR spectra for a polyaniline doped with acrylamidopropanesulfonic acid processed from a mixture of hexafluoroisopropanol and hexafluorophenylpropanol (50/50); A highly delocalized polaron absorption observed.

Emeraldine base was added to a $50/50$ mixture of hexafluoroisopropanol/hexafluorophenylpropanol and allowed to stir for 1 hour at which time the dopant was added. The reaction was allowed to react overnight. Upon addition of the dopant, a green solution was attained. After the reaction was completed, the reaction solution was filtered through 0.2 um filters. The solutions were used to spin coat excellent films having conductivity ranging from 100 to 200 S/cm. It was noticed that the conductivity dependent on the concentration of the polymer in solution. From a 0.5 to 2% solution, a conductivity of 100 S/cm was attained and above 3% a conductivity of 200 S/cm was attained. At the low % concentrations, the polymer is highly solvated and the solution basically consists of highly solvated chains with minimal interactions between chains. At the higher concentration, the chains are well solvated but there is still some interchain interactions which facilitate the interchain mobility. The UV of the above material in this $50/50$ mixture is shown in FIG. 3. As can be seen, a highly delocalized polaron absorption is attained indicating highly delocalized carriers.

The dopant was camphorsulfonic acid and acrylamidopropane sulfonic acid. Other dopants include other suitable acids such as sulfonic acids, carboxylic acids, phosphonic acids and so on.

Figure 4:
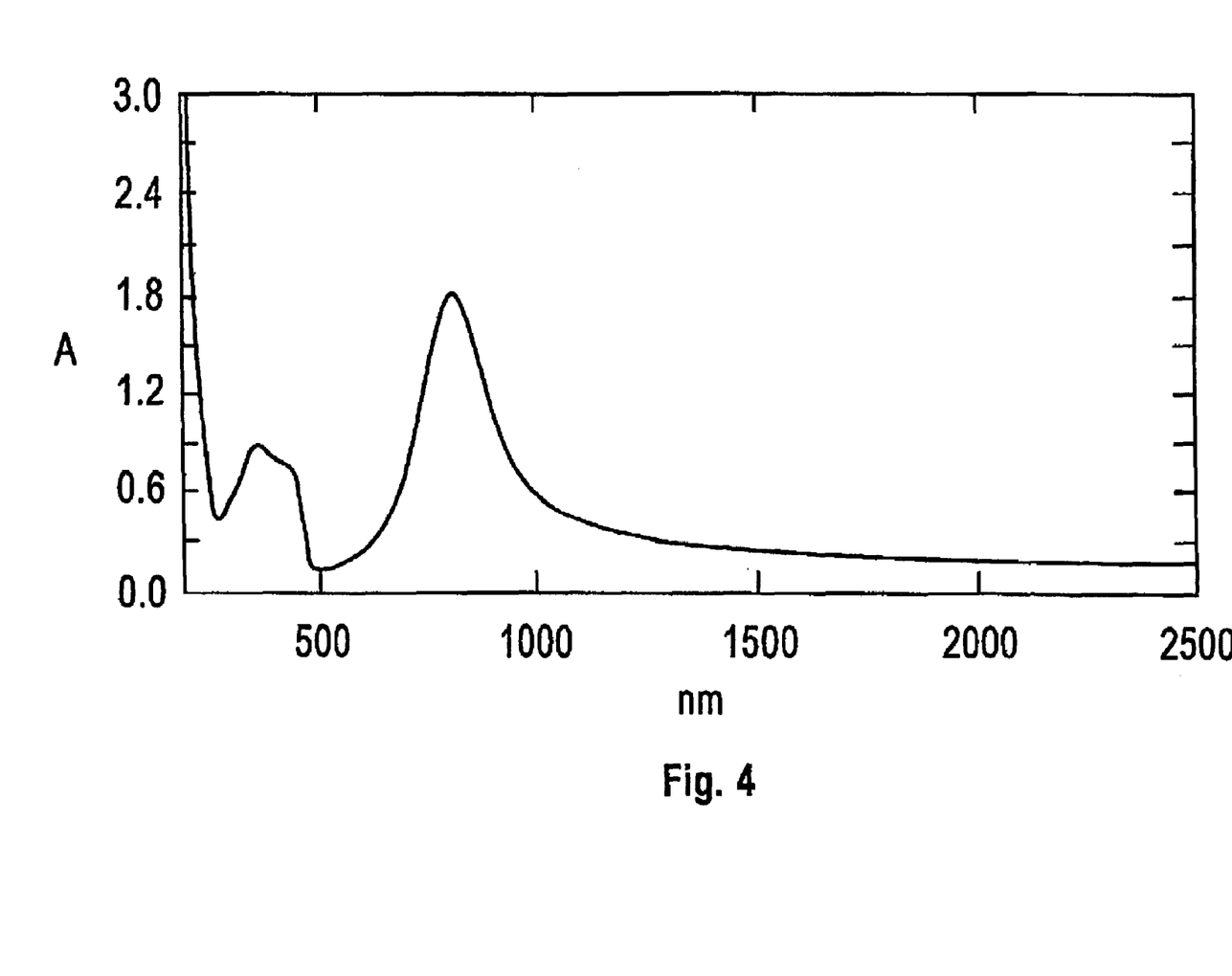
FIG. 4 depicts a ultaviolet/visible/near IR spectra for the same polyaniline doped material as in FIG. 3 but processed from NMP. A localized polaron absorption observed.

The same reaction was carried out in NMP with the same dopants. The conductivity for these films was on the order of $10^{-2}$ S/cm (4 orders of magnitude less than that observed wit the fluorianted solvent mixtures). The UV of this material is shown in FIG. 4. In contrast to the same material processed in the fluorinated solvent mixtures, this exhibits a localized polaron absorption peak indicating less delocalized carriers.

The above reaction was carried out in a number of solvents in a similar way. Table I shows the conductivities that result in the various solvents. This table is only exemplary and not limiting.

The polyanilines processed with these new solvents that give conductivities between 100 and 200 S/cm was tested in the form of coatings on various plastic sheets such as polycarbonate, petg, nylon, and PVC for EMI shielding in a TEM cell. Shielding was studied between 50 and 1000 MHz. Table 2 gives the results for these coatings. As can be seen, high conductivity polyaniline gives attenuation levels in the 30 to 40 db level.

These films are also applicable for electrodes for displays (light emitting diodes, liquid crystal displays) contacts for devices such as transistors. They can be used for resists, ESD protection, corrosion protection, and EMI shielding. The solutions are stable and give rise to excellent quality films with high clarity and transparency.

The ethoxysubstituted polyaniline as well as copolymers with aniline was also doped in these solvents as was the hydroxyethyl substituted polyanilines and copolymers with aniline. Some of these materials together with the corresponding conductivity is given in Table 1.

Figure 5:
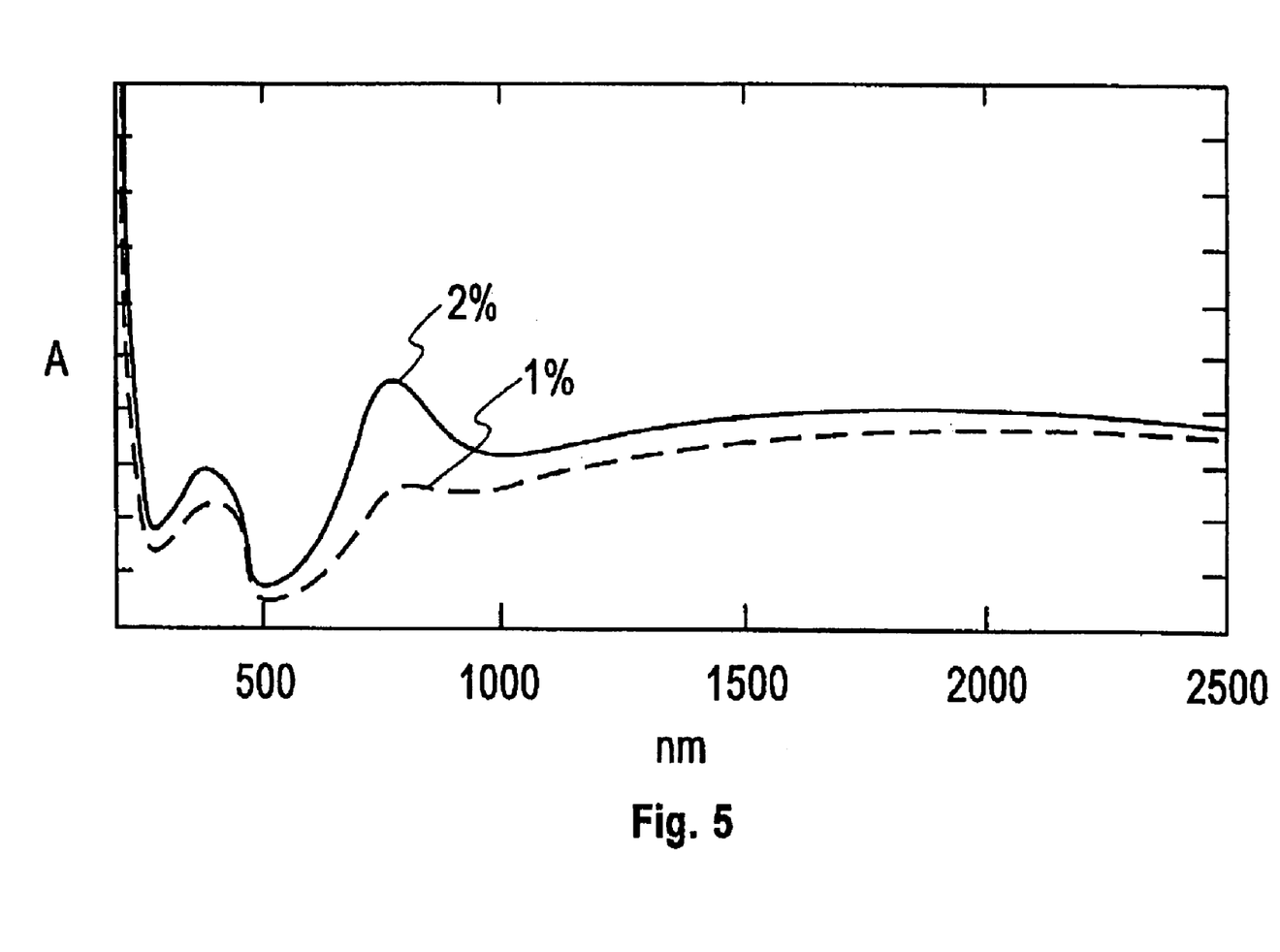
FIG. 5 depicts a ultraviolet/visible/near IR spectra for polyaniline doped material processed from hexafluoroisopropanol that shows the concentration effect. At 2%, a stronger localized polaron peak is observed indicating increased interchain interactions as compared to the 1%.

These solvents interact with the polyaniline, solvating and deaggregating the chains. This allows the chains to expand. A true solution is approached. This accounts for the high quality films and high transparency. A concentration effect on the conductivity is observed. As the concentration of the polymer decreases, a solution is approached consisting of highly solvated chains with very little interactions between chains. As the concentration increases, some interchain interactions are present which help interchain carrier mobility. FIG. 5 shows this effect as it depicts the utraviolet/visible/near IR spectra for a doped polyaniline material processed in hexafluoroisopropanol at 1 and 2%. At 2%, the localized polaron absorption is stronger than it is at 1% indicating that at 1%, most of the chains are effectively solvated minimizing interchain interactions.

These highly conducting polymers can be blended with other conductors or other thermoplastic or thermoset resins.

The teachings of all references cited herein are incorporated by reference herein.

TABLE 1

Emeraldine Base Doped with Compho-sulfonic Acid or Acriamidopropene sulfonic acid

| Solvent | Concentration | Conductivity |
|---|---|---|
| Trifluoroacetic acid | 1% | 75 s/cm |
|  | 2% | >100 s/cm |
| Hexafluoroisopropanol | 1% | 75 s/cm |
|  | 2% | 100 s/cm |
|  | 3% | >100 s/cm |
| Texafluoroisopropanol 50 | 1% | 100 s/cm |
| Hexafluorophentolpropanol 50 | 2% | 200 s/cm |
| Hexafluoroisopropanol (HFIP) Tetrafluoropropanol (TFP) 25175 | 3% | 100 s/cm |
| HFIP/TFP 50/50 | 3% | 200 s/cm |
| HFIP/TFP 75/75 | 3% | 170 s/cm |
| HFIP/TFP 63/37 | 3% | 130 s/cm |
| Perfluoro butyl alcohol | 3% | 120 s/cm |
| 2.3,J,6 Tetrafluorophenol | 3% | 200 s/cm |
| Tetrafluoropropanol | 3% | 40 s/cm |
| Hexafluorophentolpropanol/Clcolhexonone | 3% | 75 s/cm |
| Hexafluorophentlpropanol/anisole | 3% | 75 s/cm |
| 4-(Trifluoromethyl) Bentlalcohol | 3% | 50 s/cm |
| 2.4 Difluorohentyl alcohol | 3% | 50 s/cm |
| 4-Flourobentyl alcohol | 3% | 75 s/cm |
| Hexafluoropropenol/Bentyl alcohol | 3% | 75 s/cm |
| Hexafluoropropenol/Bentyl alcohol | 3% | 75 s/cm |
| HFIP/pentafluoropropenol 50150 | 3% | 140 s/cm |

While the present invention has been described with respect to preferred embodiments, numerous modifications, changes, and improvements will occur to those skilled in the art without departing from the spirit and scope of the invention.

What is claimed is:

1. A method comprising:
providing a solvent and a conjugated polymer system;
mixing said polymer comprising said polymer system with said solvent to form a solution;
said polymer is selected from the group consisting of a precursor to an electrically conductive polymer and an electrically conductive polymer;
in the event said polymer is a precursor to an electrically conductive polymer, said precursor to said electrically conductive polymer being made conductive by adding a dopant to said precursor to an electrically conductive polymer;
said solvent comprising a combination of a fluorinated polar solvent, and a nonfluorinated solvent;
said polymer in said solution characterized by a dependence of the electrical conductivity of said electrically conductive polymer and said precursor, when converted to said electrically conductive polymer, on the concentration of said polymer in said solution, selecting said concentration to substantially maximize said electrical conductivity;
processing said solution to form an article.

2. A method according to claim 1 wherein said polymer is in a solution of said fluorinated polar solvent and less than about 20 weight % of said solution.

3. A method according to claim 1 wherein said precursor polymers to said electrically conductive polymers are selected from the group consisting of: polyparaphenylenes, polyparaphenylenevinylenes, polyanilines, polyazines, polythiophenes, polythianaphthenes, polyphenylenesulfides, polyfuranes, polypyrroles, polyselenophenes, polyacetylenes and combinations thereof and copolymers thereof.

4. A method according to claim 1 wherein said polymer system was synthesized in said solvent.

5. A method according to claim 1 wherein said polymer is a precursor to an electrically conductive polymer and exposed to said solvent while said precursor is exposed to a dopant.

6. A method according to claim 1 wherein said polymer is in a solution and is less than about 5 weight percent of said solution.

7. A method according to claim 1 wherein said polymer is in a form selected from the group consisting of a solution and a solid state.

8. A method according to claim 1 wherein said fluorinated polar solvent is selected from the group consisting of:

TABLE 2

| | | Frequency (MHz) | | | | | | | | | | |
|---|---|---|---|---|---|---|---|---|---|---|---|---|
| Matter. | | 50 | 100 | 200 | 300 | 400 | 500 | 600 | 700 | 800 | 900 | 1000 |
| S.C. | 2 um | 30 | 26 | 24 | 20 | 20 | 10 | 20 | 15 | 18 | 15 | 18 |
| S.C. | 3 um | 30 | 28 | 24 | 20 | 22 | 12 | 20 | 18 | 17 | 16 | 19 |
| R.C. | 1x 1–2 | 30 | 27 | 23 | 19 | 18 | 8 | 14 | 12 | 14 | 14 | 17 |
| R.C. | 1x 4 um | 36 | 36 | 40 | 36 | 22 | 25 | 30 | 26 | 30 | 37 | 30 |
| R.C. | 2x 3 um | 33 | 33 | 35 | 30 | 25 | 27 | 32 | 25 | 31 | 30 | 30 |
| R.C. | 1x 4 um | 35 | 34 | 36 | 38 | 32 | 30 | 32 | 26 | 32 | 30 | 31 |

All values are in dB hexafluoroisopropanol, tetrafluoropropanol, pentafluoropropanol, hexafluorophenylpropanol, perfluorobutyl alcohol, octafluoropentanol, hexafluoro-2-propanol, pentafluoro-1-propanol, tetrafluorophenol, trifluorophenol, difluorophenol, tetrafluoro-1-propanol, 4-(trifluoromethyl)benzyl alcohol, 2,2,2-trifluoroethanol, 2,4,5 trifluorophenol, 2,4 difluorobenzyl alcohol, 2,4 difluorophenol, 4-fluorobenzyl alcohol, 2,2,3,3,3-pentafluoro-1-propanol, 2-(perfluorobutyl)ethanol, 2-(perfluorohexyl)ethanol, 2-(perfluorooctyl)ethanol, 2-(perfluorodecyl)ethanol, 2-perfluoro-3-methylbutyl) ethanol, 1H,1H,3H-tetrafluoro-1-propanol. 1H,1H, 5H-octafluoro-1-pentanol, 1H,1H,7H-dodecafluoro-1-heptanol, 1H, 1H, 9H-hexadecafluoro-1-nonanol, 2H-hexafluoro-2-propanol, 1H,1H,3H-hexafluoro-2-butanol, trifluoroacetic acid, perfluoropropanoic acid, perfluorobutanoic acid, perfluoropentanoic acid, perfluorohexanoic acid, perfluorohepatanoic acid, perfluorooctanoic acid, perfluorononanoic acid, perfluorodecanoic acid, 3H-tetrafluoropropanoic acid, 5H-octafluoropentanoic acid, 7H-dodecafluoropentanoic acid, 9H-hexadecafluorononanoic acid, trifluoromethansulfonic acid, heptadecafluorooctanesulfonic acid, perfluorobenzene, polyfluoroaromatic compounds, polyfluorotributylamine, perfluorotripropylamine, polyfluorotrialkylamine compounds, perfluorohexane, perfluorooctane, (perfluoro-n-octyl) ethane, perfluoro-(2,3,5-trimethylhexane), polyfluoroalkane compounds, (perfluoro-n-octyl)ethylene, polyfluoroolefin compounds, perfluorocyclohexane, perfluorodecalin, polyfluorocycloalkane compounds, perfluoro-(2-butyltetrahydrofuran), polyfluorocyclic ether compounds, perfluoro-(2-butyltetrahydrofuran), polyfluorocyclic ether compounds, trichlorotrifluoroethanol, 1,3-dichloro-1,1,2,2,3-pentafluoropropane, 1,1-dichloro-2,2,3,3,3-pentafluoropropane, chlorofluorohydrocarbons, 1,1,2-trichloro-1,2,2-trifluoroethane, perfluoro (2-butylhydrofuran), perfluorohexane, perfluoro(2-butyl tetrahydrofuran), 1,2,2-trichloro-1,2,2-trifluoroethane, perfluoro(2-butyltetrahydrofuran), perfluorohexane, 1,1,2-trichloro-1,2,2 trifluoroethane, perfluoro(2-butyltetrahydrofuran), hexafluorobenzene, benzorifluoride, bisrifluoromethylbenzene, pentafluorobenzene, 1,3-bis(trifluoromethyl)benzene, 1,4-bis(trifluoromethyl)benzene, perfluorodecalin, perfluorocyclohexane. perfluoro(1,3,5-trimethylcyclohexane), fluorine-containing alkylamine perfluorotributylamine, perfluorotripropylamine, a fluorine-containing cyclic ether, perfluoro(2-butyltetrahydrofuran), a fluorine-containing polyether, a bis(heptafluoroisopropyl)ketone, perfluorohexane, methyltrifluoroacetate, ethyltrifluoroacetate, butylpentafluoro propionate, trichlortrifluoroethane, monofluorotrichloromethane, fluorine substituted ketones, fluorine substituted esters, fluorine substituted amides, fluorine substituted ethers, fluorine substituted aromatic hydrocarbon, fluorine-substituted aliphatic hydrocarbon, 1,1,2-trichloro-1,2,2-trifluoroethane, 1,1,2,2-tetrachloro-1,1-difluoroethane, (trifluoromethyl)benzene, 1,3-bis(trifluoromethyl)benzene, 1,1,2-trifluorotrichloroethane, 1,2-difluorotetrachloroethane, hexafluorometaxylene, 1,1,2,3,4-hexafluorotetrachlorobutane, octafluorodichlorobutane, 1,1,2-trifluoro-1,2,2-trichloroethane, 1,2-difluoro-1,1,2,2-tetrafluoroethane, fluorohalogenides, perfluoroalkanes, perfluoroalkenes, cyclic fluoride compounds, perfluorohydrides, perfluorocarboxylic acids, perfluoroketones, perfluoroaldehydes, perfluoroalcohols, perfluoroethers, amine fluorides, perfluorothiols, perfluorosulfonic acids, vinyl fluoride, vinylidene fluoride, trifluororethylene, chlorotrifluororethylene, 1,2-difluoroethylene, tetrafluoroethylene, hexafluoropropylene, perfluoror(methyl vinyl) ether, perfluoro(ethyl vinyl) ether, perfluoro (propyl vinyl) ether, perfluoro (1,3-dioxole), perfluoro(2,2-dimethyl-1,3-dioxole), perfluorotoluene, perfluorocyclohexane, perfluorodimethylcyclohexane, perfluoro-methylcyclohexane, perfluorooxylene, perfluorobenzene, perfluorodecalin, perfluorodecane, perfluorohexane, perfluorooetane, perfluorodecane, trifluorotoluene, pentafluorotoluene, dichlorodifluoromethane, 1,1-dichlorotetrafluoroethane, 1,2-dichlorotetrafluoroethane, 1-chloro-1,1-fluoroethane, 1-chloroheptafluoropropane, 1,1,1,2,2-pentafluoropropane, perfluorobutane, 2,3-dichlorooctafluorobutane 2,2,3,3-tetrafluorobutanebutane, 1,1-dichloro-1-fluoroethane, 1,2-dichlorotetrafluoroethane, perfluoroisooctane, perfluorotributylamine, perfluoroheptane, perfluorinated 2-butyl tetrahydrofuran perfluorohexane, perfluorotributylamine, perfluorotriamylamine, fluorinated alkenes, pentafluorostyrene, octafluorostyrene, perfluoro-1,4-pentadiene, perfluoro-1,6-heptadiene, 3,5-bis(trifluoromethyl)styrenes, 2,2,3,3,4,4,5,5,6,6,7,7,8,8,8-pentadecafluorooctyl acrylate, 2,2,3,3,4,4,5,5,6,6,7,7,8,8,8-pentadecafluorooctyl methacrylate, 2,2,3,3,4,4,5,5,6,6,7,7,8,8,9,9,10,10,10-nonadecafluorodecyl methacrylate 1,2,2,3,3,4,4,5,5,6,6-undecafluorocyclohexylmethyl acrylate, 1,2,2,3,3,4,4,5,5,6,6-undecafluorocyclohexylmethyl acrylate, 1,2,2,3,3,4,4,5,5,6,6-decafluoro-4-trifluoromethylcyclohexylmethyl acrylate, perfluorohexyl acrylate, perfluorobutyl acrylate, perfluorodecyl acrylate, 2,2,2-trifluoroethyl acrylate, 2,2,2-trifluoroethyl methacrylate, 1,1,1,3,3,3-hexafluoro-2-propyl acrylate, $C_8F_{17}SO_2N$ (n—$C_4H_9$)$CH_2O_2C$—CH=$CH_2$, trifluorinated alkyl acrylonitriles, trifluoromethyl acrylonitrile, perfluoroalkylvinyl ethers, perfluorobutyl vinyl ether and pentafluorovinyl ether.

9. A method according to claim 1 wherein said polymer is a polyaniline.

10. A method according to claim 1 wherein said solvent comprises more than one fluorinated solvent.

11. A method according to claim 1 further including forming from said polymer an object selected from the group consisting of a film, a fiber, and a structural part.

12. A method according to claim 1 wherein an electrically conducting polymer is formed having a level of electrical conductivity thereof which is varied by varying the concentration of said polymer in solution.

13. A method according to claim 1 wherein an electrically conducting polymer or precursor is blended with a thermoset or thermoplastic polymer.

14. The method of claim 8 further including non-fluorinated solvents selected from the group consisting of non-fluorinated alcohols, phenols, esters, ethers, ketones, amides, amines, alkanes, cyclic alkanes, alkenes and aromatics.

15. The method of claim 14 wherein said non-fluorinated solvents selected from the group consisting of: anisole, benzyl alcohol, cyclohexanone, ethyl lactate, ethyl acetate diethyl ketone, diethyl malonate, m-cresol, phenol, N-methylpyrrolidinone, N-dimethylformamide, propylene glycol dimethyl ether acetate, isopropanol, ethanol, water, dimethylpropylene urea, gamma butyrolactone, diethylether, benzene, toluene, chloroform, tetrahydrofuran, heptanone, pentanone, and pentanones.

* * * * *